United States Patent
Hayashi (10) Patent No.: US 9,139,099 B2
(45) Date of Patent: Sep. 22, 2015

(54) REGENERATIVE BRAKE CONTROL DEVICE (71) Applicant: Mitsubishi Jidosha Kogyo Kabushiki Kaisha, Tokyo (JP)

(72) Inventor: Kunishige Hayashi, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/139,418

(22) Filed: Dec. 23, 2013

(65) Prior Publication Data

US 2014/0180518 A1 Jun. 26, 2014

(30) Foreign Application Priority Data

Dec. 25, 2012 (JP) ................................. 2012-281496

(51) Int. Cl.
*B60W 10/00* (2006.01)
*B60T 7/00* (2006.01)
*B60L 7/12* (2006.01)
*B60L 7/10* (2006.01)
*B60L 7/20* (2006.01)
*B60L 7/18* (2006.01)
*B60L 15/20* (2006.01)

(52) U.S. Cl.
CPC ............... *B60L 7/18* (2013.01); *B60L 15/2009* (2013.01); *B60L 15/2045* (2013.01); *Y02T 10/7283* (2013.01)

(58) Field of Classification Search
USPC ........... 701/22, 36; 180/65.1, 65.265, 65.275; 903/947
See application file for complete search history.

(56) References Cited

U.S. PATENT DOCUMENTS

| 3,881,141 | A | * | 4/1975 | Narita .............................. 318/87 |
| 5,151,637 | A | * | 9/1992 | Takada et al. ................. 318/376 |
| 5,839,533 | A | * | 11/1998 | Mikami et al. ................ 180/165 |
| 5,915,801 | A | * | 6/1999 | Taga et al. ...................... 303/152 |
| 6,686,719 | B2 | * | 2/2004 | Cochoy et al. ................ 318/801 |
| 8,137,235 | B2 | * | 3/2012 | Aimo et al. ........................ 477/4 |
| 2002/0116101 | A1 | * | 8/2002 | Hashiba et al. ................. 701/22 |
| 2004/0207350 | A1 | * | 10/2004 | Wilton et al. ................. 318/376 |
| 2004/0210356 | A1 | * | 10/2004 | Wilton et al. ................... 701/22 |

(Continued)

FOREIGN PATENT DOCUMENTS

| CN | 1421333 A | 6/2003 |
| CN | 1618649 A | 5/2005 |

(Continued)

OTHER PUBLICATIONS

Japanese Office Action, issued Mar. 27, 2015, in corresponding Japanese Patent Application No. 2012-281496.

(Continued)

*Primary Examiner* — Yonel Beaulieu
(74) *Attorney, Agent, or Firm* — Birch, Stewart, Kolasch & Birch, LLP (57) ABSTRACT

A regenerative brake control device for an electric-powered vehicle includes a first regenerative braking force setting unit that is operated by a predetermined number of times so as to change a setting of the regenerative brake control device from a normal regeneration level to a predetermined regeneration level, and a second regenerative braking force setting unit that is operated by a number of times that is greater than the predetermined number of times so as to change the setting of the regenerative brake control device from the normal regeneration level to the predetermined regeneration level.

20 Claims, 7 Drawing Sheets

(56) References Cited

U.S. PATENT DOCUMENTS

| | | |
|---|---|---|
| 2005/0104445 A1 | 5/2005 | Choi |
| 2005/0218846 A1* | 10/2005 | Moser et al. ................ 318/376 |
| 2009/0066273 A1* | 3/2009 | Dunn ............................ 318/376 |
| 2009/0093331 A1* | 4/2009 | Iwanaka et al. ................. 475/5 |
| 2012/0102970 A1* | 5/2012 | Kraemer ........................ 60/801 |

FOREIGN PATENT DOCUMENTS

| | | | |
|---|---|---|---|
| CN | 1757538 | A | 4/2006 |
| JP | 07-163008 | A | 6/1995 |
| JP | 2579650 | Y2 | 8/1998 |
| JP | 2003-252193 | A | 9/2003 |
| JP | 2005-168283 | A | 6/2005 |
| JP | 2006-064152 | A | 3/2006 |
| JP | 2012-086773 | A | 5/2012 |

OTHER PUBLICATIONS

Japanese Office Action, issued Jul. 3, 2015, in corresponding Japanese Patent Application No. 2014-194332 (with English translation).
Chinese Office Action, issued Aug. 5, 2015, in corresponding Chinese Patent Application No. 201310727960.3 (with English translation).

\* cited by examiner

| FIRST SHIFT PATTERN (OPERABLE BY SHIFT LEVER 6) | NORMAL SETTING | | | | | |
|---|---|---|---|---|---|---|
| | BL | B | D | | | |
| SECOND SHIFT PATTERN (OPERABLE BY PADDLE SWITCH 10) | BF | BE | BD | BC | BB | BA |
| REGENERATIVE BRAKING FORCE | B5 | B4 | B3 | B2 | B1 | B0 |
| | STRONG ←——— DECELERATION FEELING ———→ WEAK | | | | | |
| | LARGE ←——— REGENERATION LEVEL ———→ SMALL | | | | | |

REGENERATIVE BRAKE CONTROL DEVICE

CROSS REFERENCE TO RELATED APPLICATION

This application is based on Japanese Patent Application No. 2012-281496 filed on Dec. 25, 2012, the contents of which are incorporated herein by reference.

BACKGROUND OF THE INVENTION

1. Technical Field

The present invention relates to a technique field of a regenerative brake control device for an electric-powered vehicle, which obtains a regenerative braking force by regenerative-driving an electric motor that is a power source for traveling.

2. Background

There has been known an electric-powered vehicle that travels by driving, as a power source for travelling, an electric motor by using electric power stored in a battery (it is noted that the electric-powered vehicle in the present application is considered as a concept that includes electric vehicles having an electric motor as a power source for travelling and hybrid electric vehicles having an internal combustion engine, in addition to the electric motor). In these types of electric-powered vehicles, a braking force (regenerative braking force) is obtained by regenerative-driving the electric motor during deceleration and the kinetic energy of the vehicle is collected as the electric energy by regenerative power generation. From the viewpoint of energy efficiency, it is desirable to obtain more regenerative power generation amount by setting the regenerative braking force to be high. However, in this case, the deceleration is increased and therefore adverse effect on the drivability may increase. For this reason, it is necessary to set the regenerative braking force during deceleration in consideration of the energy efficiency or the drivability.

In view of such circumstances, Japanese Utility-Model Registration No. 2579650 discloses a technique that a driver can select, step by step, the magnitude of regenerative braking force (regeneration level) during deceleration by operating an operation member such as a shift lever. With this configuration, it is possible to obtain actively the regenerative braking force that the driver considers necessary in accordance with the travelling state. Accordingly, it is possible to achieve both the energy efficiency and the drivability.

In Japanese Utility-Model Registration No. 2579650, the regenerative braking force (regeneration level) is controlled stepwise according to the number of operations of the operation member. Here, the regenerative braking force that is intended by a driver during actual travelling is different and therefore such an operation member needs operability according to the travelling state. When it is intended to reduce the operation load of a driver (for example, as in the case of the city driving), it is preferable that the regenerative braking force can be changed to a predetermined regeneration level with a small number of operations. On the contrary, when it is intended to delicately control the switching of the regenerative braking force (for example, as in the case of the sport driving), it is preferable that the regenerative braking force can be changed to a predetermined regeneration level with a large number of operations.

However, in Japanese Utility-Model Registration No. 2579650, the number of operations of the operating member required to change the regenerative braking force to a predetermined regeneration level is uniquely determined in advance and therefore a driver cannot change the number of operations. Accordingly, it is difficult to cope with such various demands.

The present invention has been made to solve the above-described disadvantages and an object thereof is to provide a regenerative brake control device that is capable of easily controlling a regenerative brake to a predetermined regeneration level with operability according to the travelling state.

SUMMARY OF THE INVENTION (1) According to an aspect of the invention, in order to solve the above disadvantages, a regenerative brake control device for an electric-powered vehicle includes a first regenerative braking force setting unit that is operated by a predetermined number of times so as to change a setting of the regenerative brake control device from a normal regeneration level to a predetermined regeneration level, and a second regenerative braking force setting unit that is operated by a number of times that is greater than the predetermined number of times so as to change the setting of the regenerative brake control device from the normal regeneration level to the predetermined regeneration level.

With the configuration (1), since a plurality of regenerative braking force setting unit having different number of operations for setting a predetermined regeneration level is provided, it is possible to control the regenerative braking force in accordance with the intention of a driver considering the travelling state. In the first regenerative braking force setting unit the number of shift operations for obtaining the same amount of generation is reduced, as compared to the second regenerative braking force setting unit. Accordingly, it is possible to easily control the increase and decrease of the regenerative braking force with a small number of operations and therefore the first regenerative braking force setting unit is suitable for reducing the operation load of a driver. On the contrary, in the second regenerative braking force setting unit, the number of shift operations for obtaining the same amount of generation is increased, as compared to the first regenerative braking force setting unit. Accordingly, it is possible to delicately control the regenerative braking force.

(2) In the configuration of (1), the amount of change in the regeneration ratio between the normal regeneration level and a first regeneration level that is set by the first regenerative braking force setting unit is smaller than the amount of change in the regeneration ratio between the first regeneration level that is set by the first regenerative braking force setting unit and a second regeneration level that is set by the first regenerative braking force setting unit, and a regeneration ratio of the first regeneration level that is set by the first regenerative braking force setting unit is smaller than a regeneration ratio of the second regeneration level that is set by the first regenerative braking force setting unit.

With the configuration (2), since the first regenerative braking force setting unit in which the regeneration ratio between the regeneration levels is greatly changed is operated when it is intended to greatly change the amount of regeneration, it is possible to rapidly obtain the amount of regeneration required by a driver.

(3) In the configuration of (1) or (2), the amount of change in the regeneration ratio between the normal regeneration level and a first regeneration level that is set by the second regenerative braking force setting unit is equal to the amount of change in the regeneration ratio between the first regeneration level that is set by the second regenerative braking force setting unit and a second regeneration level that is set by the second regenerative braking force setting unit.

With the configuration (3), since it is possible to increase or decrease step by step the amount of regeneration by using the second regenerative braking force setting unit, it is possible to perform a delicate regeneration control.

(4) In any one of the configurations of (1) to (3), one of regenerative levels of the first regenerative braking force setting unit is the same as one of regenerative levels of the second regenerative braking force setting unit. The regeneration ratio of the second regeneration level that is set by the first regenerative braking force setting unit is equal to a regeneration ratio of the third regeneration level that is set by the second regenerative braking force setting unit.

With the configuration (4), since each of the regenerative braking force setting units has the regeneration levels in which the regeneration ratio is equal to each other and therefore the number of operations for setting a predetermined regeneration level is different from each other, a plurality of regenerative braking force setting units having different usability can be selectively used in a smooth manner. As a result, the switching freedom of the regeneration level by the regenerative braking force setting units is increased and therefore it is possible to cope with various travelling patterns.

(5) In any one of the configurations (1) to (4), the first regenerative braking force setting unit is a shift lever and, the second regenerative braking force setting unit is a paddle switch.

With the configuration (5), since the shift lever and the paddle switch are employed as the regenerative braking force setting units it is possible to effectively control the regenerative brake in accordance with the operability of each of the shift lever and the paddle switch. In the paddle switch provided in the steering wheel, the number of operations for setting a predetermined regeneration level is set to be larger and therefore it is possible to cope with the situation (for example, the sport driving or the like) where a delicate switching of the regenerative level is required. On the other hand, in the shift lever, the number of operations for setting a predetermined regeneration level is set to be smaller and therefore it is possible to effectively control the regenerative braking force with a small number of operations, in the case of the city driving, for example.

(6) In any one of the configuration of (1) to (5), the electric-powered vehicle includes: a regenerative brake control unit that controls an electric motor that drives vehicle wheels into a given regeneration ratio which is set based on at least one of the first regenerative braking force setting unit and the second regenerative braking level setting unit; and an automatic vehicle-speed control unit that automatically controls a vehicle-speed. The generative brake control unit returns the regenerative braking force to a preset initial value, irrespective of setting values by the first regenerative braking force setting unit and the second regenerative braking force setting unit, when the automatic vehicle-speed control unit is actuated. Also, the normal regeneration level corresponds to a preset initial value of the regenerative braking force.

With the configuration (6), during operation of an automatic vehicle-speed control device for automatically controlling a vehicle-speed (for example, when performing a cruise-control control for maintaining the vehicle-speed at a predetermined value or a radar cruise-control control for maintaining an inter-vehicle distance detected by a radar at a predetermined value, or the like), the regenerative braking force is automatically returned to an initial value. As a result, it is possible to control the regenerative braking force as needed while taking advantage of automatic vehicle-speed control that can reduce the operation load of a driver.

According to the present invention, since a plurality of regenerative braking force setting units having different shift patterns is provided, it is possible to selectively control the regenerative braking force in a shift pattern according to the intention of a driver considering the travelling state. In the first regenerative braking force setting unit the number of operations for obtaining the same amount of generation is reduced, as compared to the second regenerative braking force setting unit. Accordingly, it is possible to easily control the increase and decrease of the regenerative braking force with a small number of operations and therefore the first regenerative braking force setting unit is suitable for reducing the operation load of a driver. On the contrary, in the second regenerative braking force setting unit the number of operations for obtaining the same amount of generation is increased, as compared to the first regenerative braking force setting unit. Accordingly, it is possible to delicately control the regenerative braking force.

DESCRIPTION OF PREFERRED EMBODIMENT

Hereinafter, exemplary embodiments of the present invention will be described in detail with reference to the accompanying drawings. However, it should be noted that the dimension, material, shape and relative arrangement or the like of the components described in these exemplary embodiments are not intended to limit the scope of the present invention but represented for the purpose of illustration only, unless otherwise specified.

Figure 1:
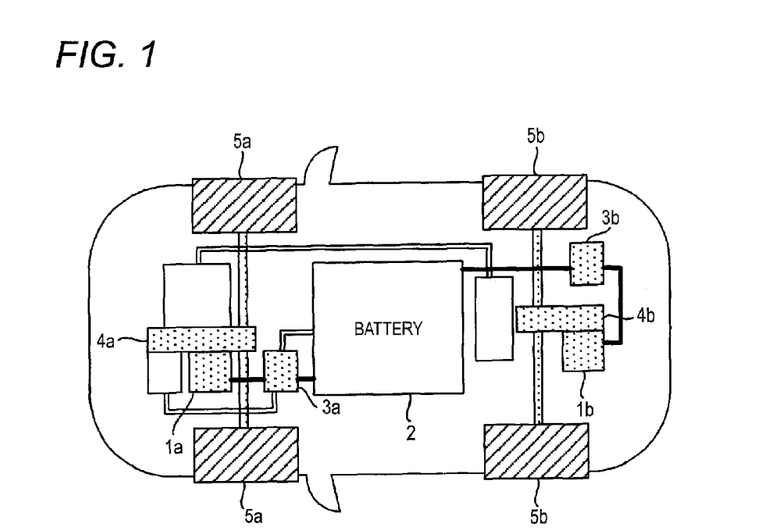
FIG. 1 is a schematic view showing an entire configuration of an electric-powered vehicle on which a regenerative brake control device according to an illustrative embodiment is mounted.

FIG. 1 is a schematic view showing an entire configuration of an electric-powered vehicle (hereinafter, referred to as a "vehicle" as appropriate) on which a regenerative brake control device according to the present embodiment is mounted. By referring to FIG. 1, as a power source for travelling, a front motor $1a$ and rear motor $1b$ that are electric motors are provided on the front side and rear side, respectively (hereinafter, the front motor $1a$ and the rear motor $1b$ may be collectively referred to a "motor 1"). A battery 2 in which DC electric power is stored in advance is mounted on the vehicle. The electric power discharged from the battery 2 is converted into AC electric power by a front inverter 3a and a rear inverter 3b and then supplied to the front motor 1a and the rear motor 1b, respectively. The power outputted from the front motor 1a is transmitted to front drive wheels 5a via a front transaxle 4a and the power outputted from the rear motor 1b is transmitted to rear drive wheels 5b via a rear transaxle 4b.

The motor 1 is regenerative-driven when the vehicle is decelerated or travels on a downhill road in an accelerator-off state and serves as a generator. During the regenerative-driving of the motor 1, brake feeling (regenerative brake) is given and the kinetic energy is collected in the battery 2 as the electric energy. In the regenerative-driving of the motor 1, AC electric power is generated, converted into DC electric power by the inverter 3 and then stored in the battery 2. As described above, in the electric-powered vehicle, the kinetic energy is collected in the battery 2 as the electric energy by the regenerative-driving of the motor 1 and therefore effective use of energy is made. Here, the magnitude of the regenerative braking force of the motor 1 can be controlled stepwise by the regenerative brake control (to be described later).

Figure 2:
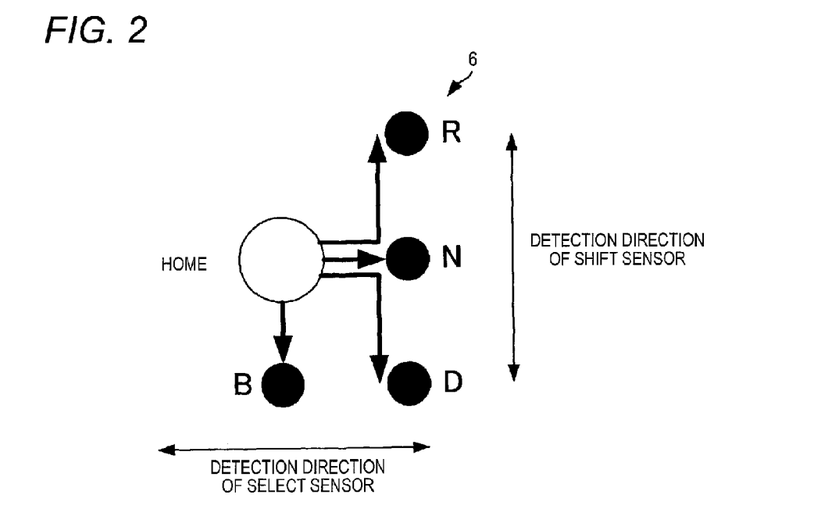
FIG. 2 is a schematic view showing a peripheral configuration of a shift lever provided in a driver's seat of the electric-powered vehicle, as seen from the upper side.

A shift lever 6 (first regenerative braking force setting unit) is provided in a driver's seat of such a vehicle and is capable of switching the travelling mode by the operation of a driver. FIG. 2 is a schematic view showing a peripheral configuration of the shift lever 6 provided in a driver's seat of the vehicle, as seen from the upper side.

The shift lever 6 is set, as an initial state, to a home position illustrated and can be switched to a corresponding travelling mode by the operation of a driver to change the shift position in the front-back and left-right directions along an arrow. Here, N position indicates a neutral position where the power of the motor 1 is not transmitted to the drive wheels 5, D position indicates a normal travelling mode where the vehicle travels forward and R position indicates a retreat mode where the vehicle travels rearward.

When the D position is selected and therefore the vehicle is in the normal travelling mode, it is possible to shift the regenerative braking force of the motor 1 stepwise by operating the shift lever 6 to B position. When a driver operates the shift lever 6 to the B position and then opens the shift lever 6, the shift lever 6 is configured to return to the home position automatically and the regenerative braking force (regeneration level) is shifted stepwise in accordance with the number of operations when being operated to the B position.

An operation state of the shift lever 6 is detected by a shift sensor (not shown) and a select sensor (not shown), which are incorporated in the shift lever 6. The shift sensor outputs, as a voltage signal, an operation state in a longitudinal direction (a vertical direction in FIG. 2) of the shift lever and the select sensor outputs, as a voltage signal, an operation state in a lateral direction of the shift lever. As described later, a control system of a vehicle is adapted to grasp the operated position of the shift lever 6 by acquiring the voltage signal outputted from the shift sensor and the select sensor.

Figure 3:
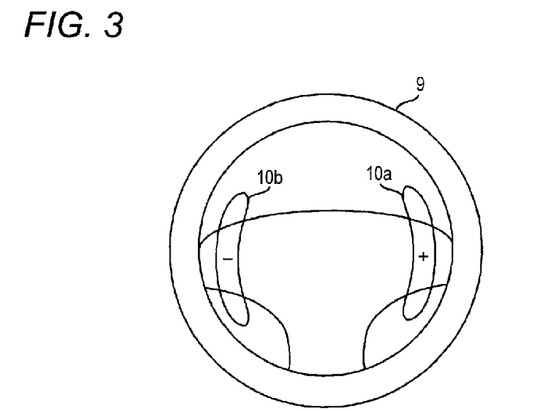
FIG. 3 is a schematic view showing a peripheral configuration of a paddle switch of a steering wheel that is provided in the driver's seat of the electric-powered vehicle.

FIG. 3 is a schematic view showing a peripheral configuration of a paddle switch 10 (second regenerative braking force setting unit) of a steering wheel 9 that is provided in a driver's seat of a vehicle. The paddle switch 10 includes a paddle plus switch 10a that can be switched in a direction to reduce the regenerative braking force stepwise and a paddle minus switch 10b that can be switched in a direction to increase the regenerative braking force stepwise. A driver can operate the paddle switch while gripping the steering wheel 9.

Figure 4:
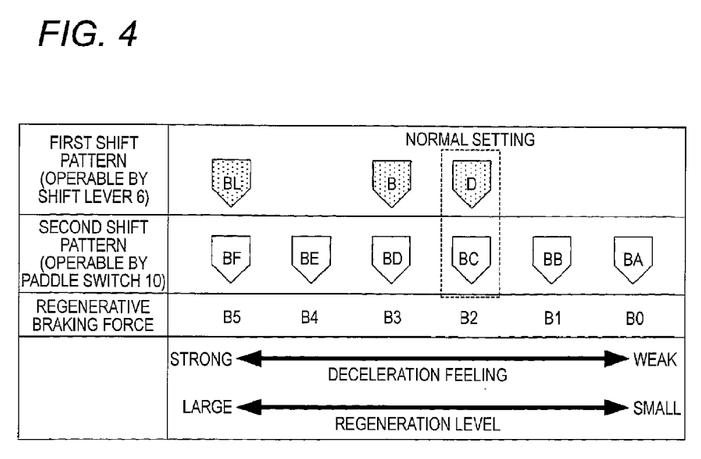
FIG. 4 is a conceptual view showing a regenerative braking force that can be set by the shift lever and the paddle switch.

FIG. 4 is a conceptual view showing the regenerative braking force that can be set by the shift lever 6 and the paddle switch 10. Here, the regenerative braking force refers to a regeneration ratio. The regeneration ratio refers to the amount of regeneration when being measured at a constant speed. The regenerative braking force of the motor 1 is set to six shift stages of B0 to B5 according to the magnitude thereof. Here, each shift stage is referred to as a regeneration level, a series of shift stages that can be set by the shift lever 6 are collectively referred to as a first shift pattern and a series of shift stages that can be set by the paddle switch 10 are collectively referred to as a second shift pattern. The regenerative braking force becomes stronger toward B5 from B0 and, correspondingly, the deceleration feeling of a driver or the regeneration level is increased.

The first shift pattern that can be selected by the shift lever 6 (a first regenerative braking force setting unit) has the regeneration levels of shift stages D (a normal regeneration level which is settable by the first regeneration level setting unit), B (a first regeneration level which is settable by the first regeneration level setting unit), BL (a second regeneration level which is settable by the first regeneration level setting unit). The shift stage D can be selected by operating the shift lever 6 to the D position and, at this time, the regenerative braking force corresponds to B2 that is an initial value. The shift stage D is shifted to the shift stage B by operating the shift lever 6 from the D position to the B position one time and the shift stage B is set to the regeneration braking force B3 that is stronger than that of the shift stage D. The shift stage B is shifted to the shift stage BL by operating the shift lever 6 to the B position one more time and the shift stage BL is set to the regeneration braking force B5 that is stronger than that of the shift stage B.

Here, the amount of change in the regeneration ratio from the B3 to the B5 is greater than the amount of change in the regeneration ratio from the B2 to the B3. In this way, since the amount of change in the regeneration ratio between the regeneration levels that are set by the shift lever 6 is set to be larger toward the regeneration level having high regeneration ratio, it is possible to rapidly obtain the amount of regeneration required by a driver with the operation of the shift lever 6 even when the amount of generation is greatly changed.

Further, the number of shift stages of the shift lever 6 is smaller than that of the paddle switch 10 and therefore the number of operations for setting a predetermined regeneration level is set to be smaller. For this reason, in the shift lever 6, the number of shift operations for obtaining the same amount of generation is reduced, as compared to the paddle switch 10. Accordingly, it is possible to easily control the increase and decrease of the regenerative braking force with a small number of operations and therefore the shift lever is suitable for reducing the operation load of a driver.

The second shift pattern that can be selected by the paddle switch 10 (a second regenerative braking force setting unit) has the regeneration levels of shift stages BA, BB, BC (a normal regeneration level which is settable by the second regeneration level setting unit), BD (a first regeneration level which is settable by the second regeneration level setting unit), BE (a second regeneration level which is settable by the second regeneration level setting unit), BF (a third regeneration level which is settable by the second regeneration level setting unit) and the number of shift stages thereof is larger than that of the first shift pattern. Each of the shift stages BA, BB, BC, BD, BE, BF has regenerative braking forces corresponding to B0, B1, B2, B3, B4, B5 and transition among these shift stages can be made according to the number of operations of the paddle plus switch 10a and the paddle minus switch 10b.

Here, the amount of change in the regeneration ratio of each of B0, B1, B2, B3, B4, B5 may be equal to each other. In this way, since the amount of change in the regeneration ratio between the regeneration levels that are set by the paddle switch 10 is set to be equal to each other, it is possible to increase or decrease step by step the amount of regeneration. Accordingly, it is possible to perform a delicate regeneration control.

Further, the number of shift stages of the paddle switch 10 is greater than that of the shift lever 6 and therefore the number of operations for setting a predetermined regeneration level is set to be larger. For this reason, the paddle switch is suitable for delicately controlling the regenerative braking force.

In this way, since the shift lever 6 and the paddle switch 10, which have different number of operations for setting a predetermined regeneration level, are provided, it is possible to control the regenerative braking force in accordance with the intention of a driver considering the travelling state. Particularly, in the shift lever 6, the number of shift operations for obtaining the same amount of generation is reduced, as compared to the paddle switch 10. Accordingly, it is possible to easily control the increase and decrease of the regenerative braking force with a small number of operations and therefore the shift lever 6 is suitable for reducing the operation load of a driver. On the contrary, in the paddle switch 10, the number of shift operations for obtaining the same amount of generation is set to be greater, as compared to the shift lever 6. Accordingly, it is possible to delicately control the regenerative braking force.

Out of each shift stage as described above, the B of the first shift pattern and the BD of the second shift pattern are shared as a shift stage having a regeneration level whose regeneration ratio is equal to each other and the BL of the first shift pattern and the BF of the second shift pattern are shared as a shift stage having a regeneration level whose regeneration ratio is equal to each other. As will be described in more detail, with this configuration, the number of operations for setting a predetermined regeneration level is different from each other and therefore the shift lever 6 and the paddle switch 10, which have different usability, can be selectively used in a smooth manner. As a result, the degree of the freedom of switching of the regeneration level by the regenerative braking force setting units is increased and therefore it is possible to cope with various travelling patterns.

Figure 5:
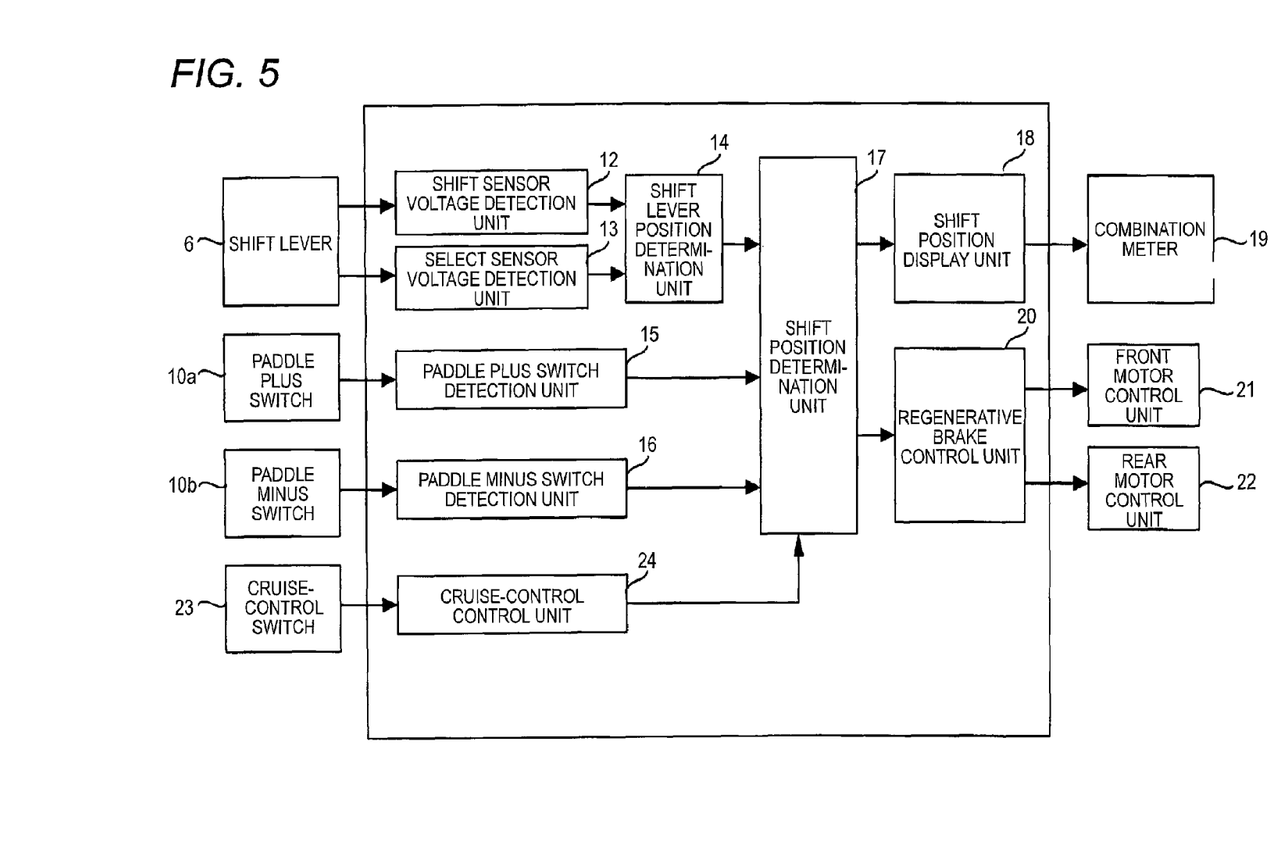
FIG. 5 is a block diagram functionally showing a configuration of the regenerative brake control device mounted on the electric-powered vehicle.

Control of the regenerative braking force based on the above-described shift patterns is performed by a regenerative brake control device mounted on a vehicle. FIG. 5 is a block diagram functionally showing a configuration of the regenerative brake control device mounted on a vehicle.

The operation position of the shift lever 6 is determined by a shift lever determination unit 14 in such a way that a shift sensor voltage detection unit 12 and a select sensor voltage detection unit 13 detect the voltage signal outputted from a shift sensor and a select sensor, which are incorporated in the shift lever 6. Further, the operation of the paddle plus switch 10a and the paddle minus switch 10b is detected by a paddle plus switch detection unit 15 and a paddle minus switch detection unit 16, respectively.

A shift position determination unit 17 determines the shift stage of the regenerative braking force based on the detection result of each of the shift lever determination unit 14, the paddle plus switch detection unit 15 and the paddle minus switch detection unit 16. Specifically, the shift stage to be switched is determined in accordance with the number of operations of operating the shift lever 6 to the B position and the number of operations of the paddle plus switch 10a and the paddle minus switch 10b, on the basis of the initial shift stage (B) of the regenerative braking force.

When the shift stage of the regenerative brake is determined by the shift position determination unit 17, a shift position display unit 18 displays the determined shift stage on a combination meter 19 to inform a driver of the determined shift stage. Meanwhile, a regenerative brake control unit 20 controls the regenerative braking force by instructing the front motor 1a and the rear motor 1b via a front motor control unit 21 and a rear motor control unit 22 so as to achieve the shift stage determined by the shift position determination unit 17.

Further, a cruise-control switch 23 for switching ON/OFF of a cruise-control control that automatically controls a vehicle-speed may be provided in a driver's seat of a vehicle. A cruise-control control unit 24 determines whether or not the cruise-control switch 23 is operated by a driver and performs the cruise-control control according to the determination result. Here, the cruise-control control refers to an automatic vehicle-speed control of automatically controlling the vehicle-speed and includes, for example, a cruise-control control for maintaining the vehicle-speed at a predetermined value or a radar cruise-control control for maintaining an inter-vehicle distance detected by a radar at a predetermined value, or the like.

Figure 6A:
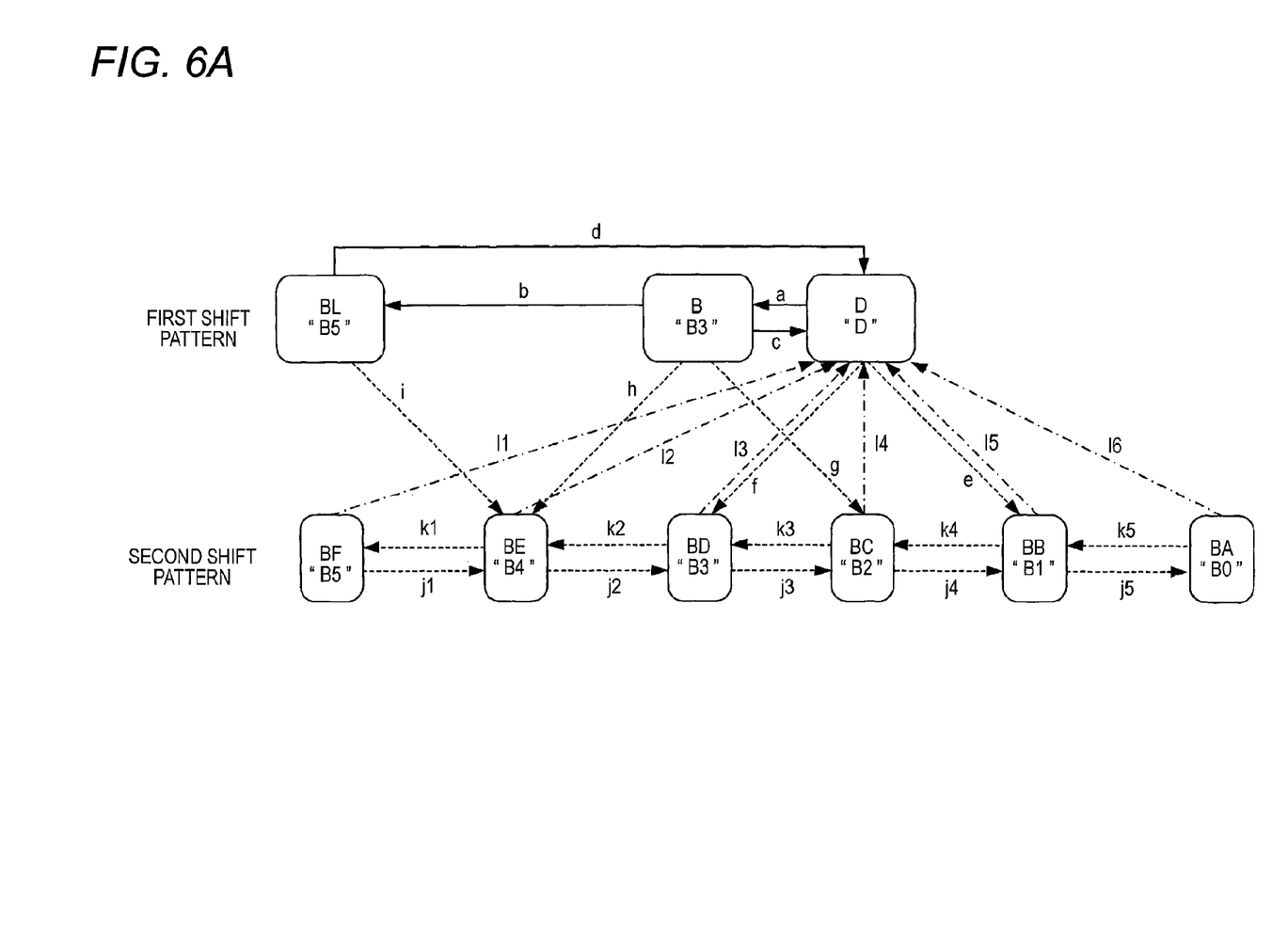
FIG. 6A is a state transition view schematically showing the transition among the shift stages of a regenerative brake by the regenerative brake control device.
Figure 6B:
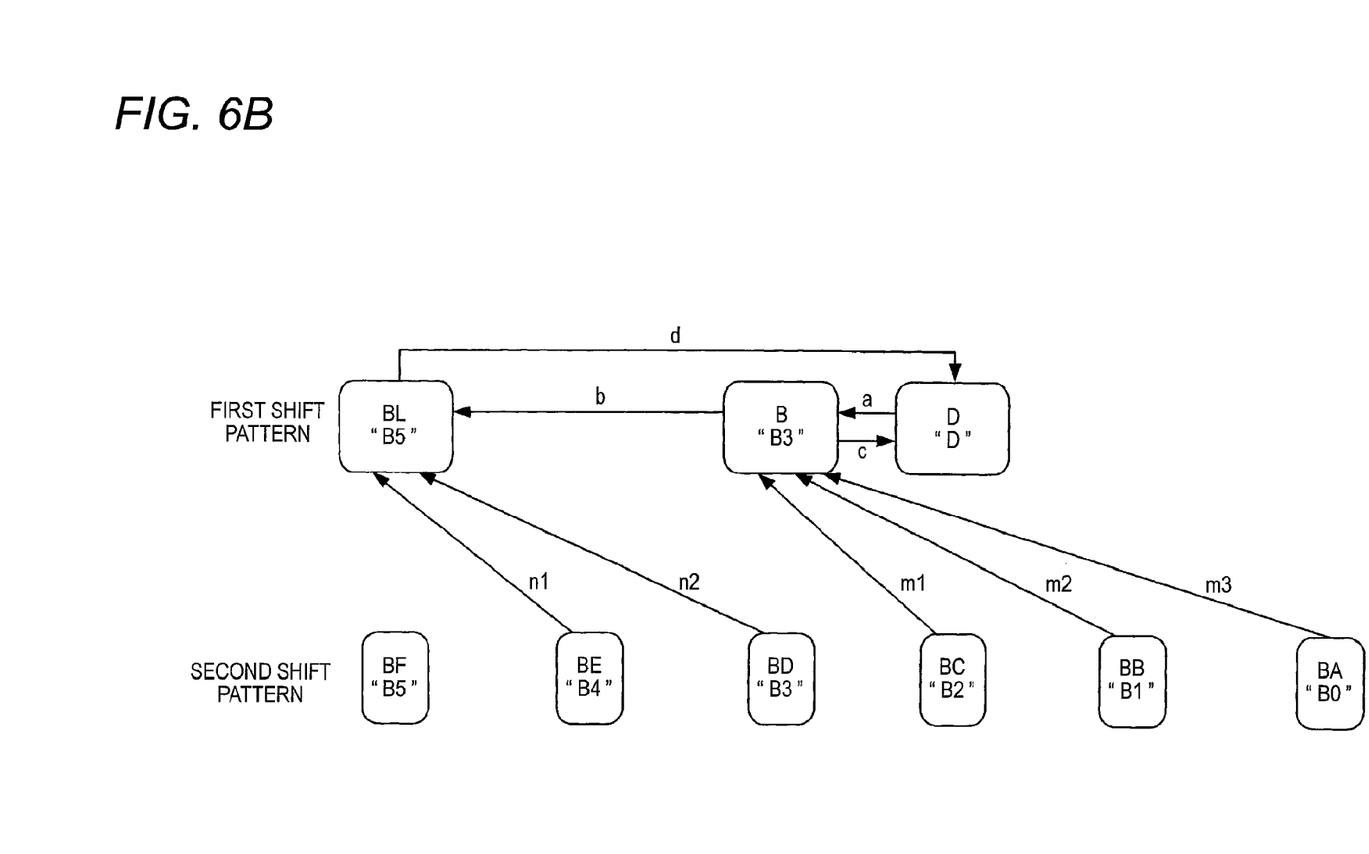
FIG. 6B is a state transition view schematically showing the transition among the shift stages of a regenerative brake by the regenerative brake control device.

FIG. 6A and FIG. 6B are state transition views schematically showing the transition among the shift stages of the regenerative brake by the regenerative brake control device. In the following description, it is assumed that, as an initial state, the shift lever 6 is set to the D position and a vehicle travels in a normal travelling mode. In addition, although the state transition view is separately shown in FIG. 6A and FIG. 6B, this is intended for the purpose of clarity of illustration.

In FIG. 6A and FIG. 6B, the first shift pattern that is settable by the shift lever 6 is shown in the upper side and the second shift pattern that is settable by the paddle switch 10 is shown in the lower side. The names as described by referring to FIG. 4 and the magnitude of the corresponding regenerative braking force are described in the shift stages included in each of the shift patterns.

First, as shown in FIG. 6A, when the shift lever 6 is operated to the B position, the shift stage is shifted from an initial state D to B (solid arrow "a") and strength of the regenerative brake is increased from B2 to B3. Further, when the shift lever 6 is operated to the B position again, the shift stage is shifted from B to BL (solid arrow "b") and the strength of the regenerative brake is increased from B3 to B5. By operating the shift lever 6 to the B position in this way, it is possible to change the regenerative braking force in accordance with the first shift pattern. Particularly, since the number of shift stages of the first shift pattern is smaller than that of the second shift pattern, it is possible to perform the regenerative brake control over a wide range with small operation load.

Meanwhile, when the shift lever 6 is operated to the B position again in a state where the shift stage is in BL, the regenerative brake is maintained in the present shift stage because even stronger shift stage does not exist. Further, in B and BL where the regenerative brake is strengthened as compared to the initial state, it is possible to return the shift stage to the initial state D by operating the shift lever 6 to the D position (solid arrows "c" and "d").

When the paddle switch 10 is operated in a state where the shift stage is in D, B, BL that are selectable by the shift lever 6, the shift pattern is shifted from the first shift pattern to the second shift pattern and the shift stage is shifted to a shift stage having a regenerative braking force with adjacent magnitude. Specifically, when the paddle plus switch 10a is operated in a state where the shift stage is in the initial state D, the shift stage is shifted to BB where the regenerative brake is weakened by one stage (dashed arrow "e"). On the other hand, when the paddle minus switch 10b is operated in a state where the shift stage is in the initial state D, the shift stage is shifted to BD where the regenerative brake is strengthened by one stage (dashed arrow "f").

Further, when the paddle plus switch 10a is operated in a state where the shift stage is in B, the shift stage is shifted to BC where the regenerative brake is weakened by one stage (dashed arrow "g"). On the other hand, when the paddle minus switch 10b is operated in a state where the shift stage is in B, the shift stage is shifted to BE where the regenerative brake is strengthened by one stage (dashed arrow "h").

Further, when the paddle plus switch 10a is operated in a state where the shift stage is in BL, the shift stage is shifted to BE where the regenerative brake is weakened by one stage (dashed arrow "i"). On the other hand, when the paddle minus switch 10b is operated in a state where the shift stage is in BL, the regenerative brake is maintained in the present shift stage because even stronger shift stage does not exist.

In this way, when the paddle switch 10 is operated in a state where the shift stage is in the first shift pattern, the shift pattern is shifted from the first shift pattern to the second shift pattern. Thereafter, when the paddle switch 10 is further operated, the shift stage is shifted, by such an operation, to a shift stage having a regenerative braking force with adjacent magnitude. Specifically, when the paddle plus switch 10a is operated, the shift stage is shifted to a shift stage where the regenerative brake is weakened by one stage (dashed arrows "j1 to j5") and when the paddle minus switch 10b is operated, the shift stage is shifted to a shift stage where the regenerative brake is strengthened by one stage (dashed arrows "k1 to k5").

Further, in the shift stages BA to BF on the second shift pattern, the shift stage is returned to the initial state D when the paddle plus switch 10a is operated in an ON state for a predetermined period (one dot chain line "l1 to l6"). In this way, since the second shift pattern can be returned to the initial state D only by the operation of the paddle switch 10 without using the shift lever 6, initialization can be made in a state where a driver grips the steering wheel 9.

Subsequently, as shown in FIG. 6B, when the shift lever 6 is operated to the B position in a state where the shift stage is on the second shift pattern, the shift pattern is shifted to the first shift pattern. Then, the shift stage is shifted to a state where the regenerative braking force is greater than that of the present state and approximated to that of the present state, out of B and BL on the first shift pattern. Specifically, when the shift lever 6 is operated to the B position in a state where the shift stage is in BA to BC, the shift stage is shifted to B (solid arrows "m1 to m3"). On the other hand, when the shift lever 6 is operated to the B position in a state where the shift stage is in BD to BE, the shift stage is shifted to BL (solid arrows "n1 to n2").

Meanwhile, even when the shift lever 6 is operated to B position in a state where the shift stage is in BF, the regenerative brake is maintained in the present shift stage because even stronger shift stage does not exist.

As described above, in the present embodiment, since the shift lever 6 and the paddle switch 10, which have different number of operations for setting a predetermined regeneration level, are provided, it is possible to control the regenerative braking force in accordance with the intention of a driver considering the travelling state.

First Modification

Figure 7:
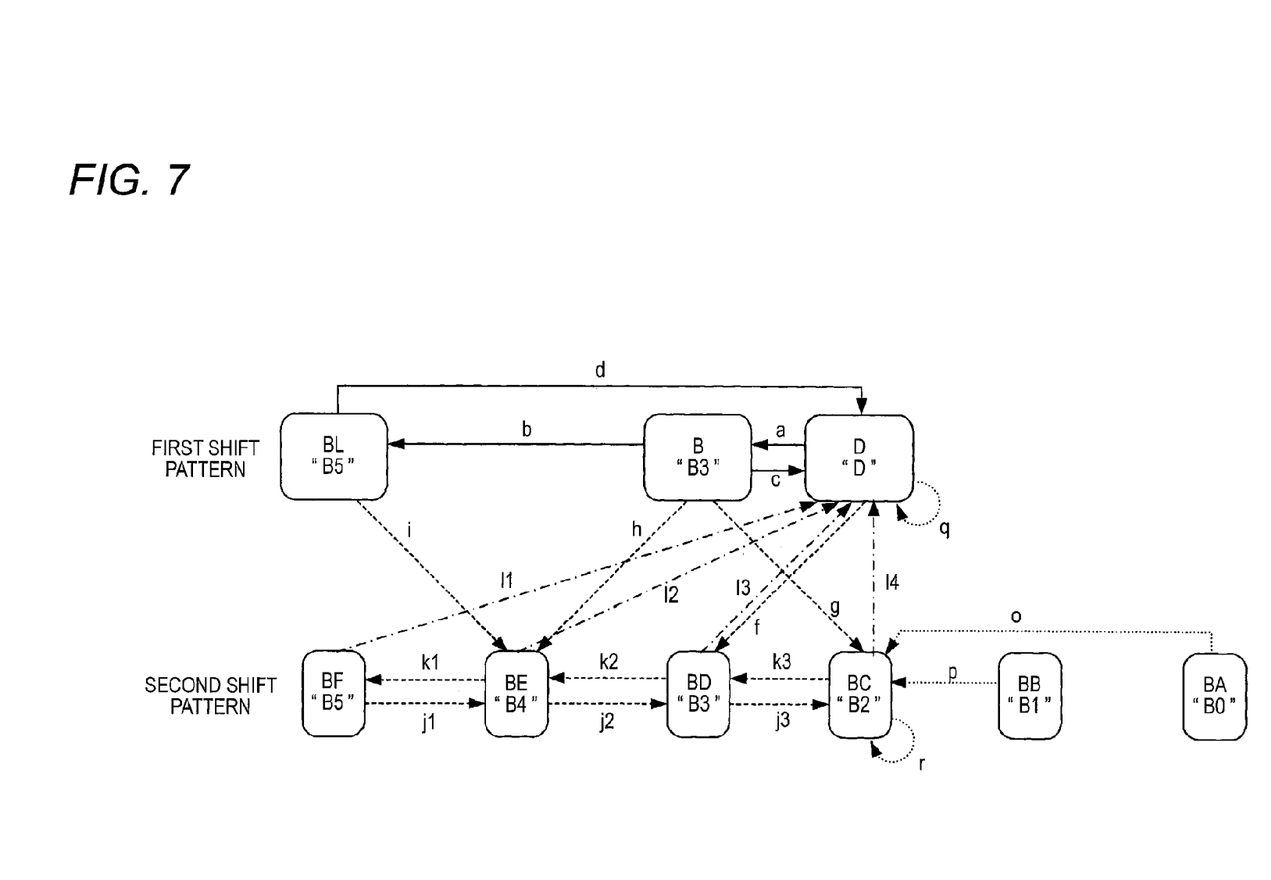
FIG. 7 shows a first modification of FIG. 6A and FIG. 6B.

FIG. 7 is a state transition view schematically showing the transition among the shift stages of a regeneration brake by a regenerative brake control device according to a first modification. The first modification is different from the above-described embodiment in that the cruise-control control unit 24 performs a cruise-control control for maintaining a vehicle-speed at a predetermined value with the operation of a driver to turn on the cruise-control switch. In FIG. 7, the same or similar element will be denoted by the same reference numeral as that of the above-described embodiment and a duplicated explanation thereof will be properly omitted.

When the cruise-control switch 23 is turned on by a driver, the cruise-control control unit 24 performs an automatic vehicle-speed control so that a vehicle-speed is a setting target value. At this time, the regenerative brake control device prohibits transition to the shift stages BA and BB having the regeneration level smaller than the initial value (B2) so that the amount of regeneration during a low-speed travelling exceeds a predetermined value. For example, in a case where the shift stage of the regenerative brake is in BA and BB when the cruise-control switch 23 is turned on, the regenerative brake is automatically shifted to BC that is an initial value (B2) (dotted arrows "o" and "p"). Further, when the paddle plus switch 10a is operated in a state where the shift stage is in D and BC, the shift operation is cancelled so that the shift stage is not shifted to BA and BB (dotted arrows "q" and "r").

Second Modification

Figure 8:
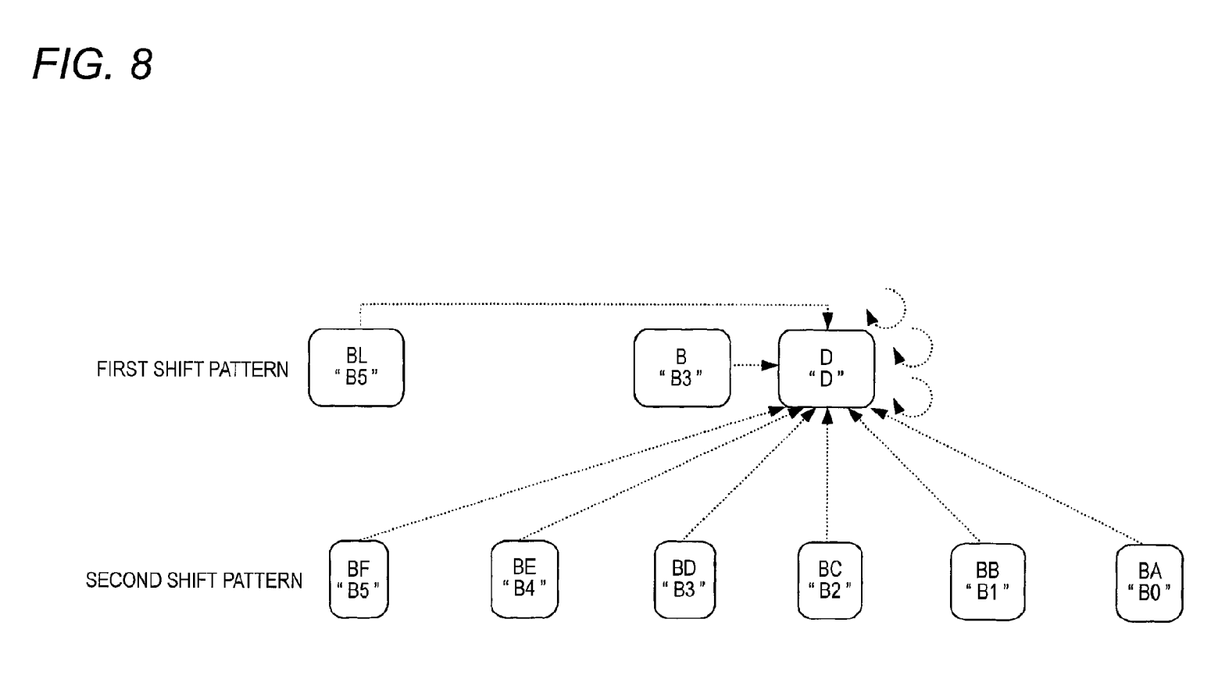
FIG. 8 shows a second modification of FIG. 6A and FIG. 6B.

FIG. 8 is a state transition view schematically showing the transition among the shift stages of a regeneration brake by a regenerative brake control device according to a second modification. The second modification is different from the above-described embodiment in that the cruise-control control unit 24 performs a radar cruise-control control for maintaining an inter-vehicle distance detected by a radar at a predetermined value with the operation of a driver to turn on the cruise-control switch. In FIG. 8, the same or similar element will be denoted by the same reference numeral as that of the above-described embodiment and a duplicated explanation thereof will be properly omitted.

When the cruise-control switch 23 is turned on by a driver, the cruise-control control unit 24 performs an automatic vehicle-speed control so that the inter-vehicle distance detected by the radar is maintained at a predetermined value. Since an overall control including the control of the regenerative brake of the motor 1 is performed in the radar cruise-control control, even when the shift lever 6 or the paddle switch 10 is operated, such operation is cancelled and the shift stage of the regenerative brake is returned to the initial state D (dotted arrow in FIG. 8).

The present invention can be applied to a regenerative brake control device for an electric-powered vehicle, which obtains a regenerative braking force by regenerative-driving an electric motor that is a power source for travelling.

What is claimed is:

1. A regenerative brake control device for an electric-powered vehicle comprising:
a first regenerative braking force setting unit that selectively sets a regeneration level from among a plurality of first regeneration levels, the first regenerative braking force setting unit being configured to be operated a predetermined number of times so as to change a setting of the regenerative brake control device from a normal regeneration level to a predetermined regeneration level; and
a second regenerative braking force setting unit that selectively sets a regeneration level from among a plurality of second regeneration levels, a number of the plurality of second regeneration levels being different from a number of the plurality of first regeneration levels, the second regenerative braking force setting unit being configured to be operated a number of times that is greater than the predetermined number of times so as to change the setting of the regenerative brake control device from the normal regeneration level to the predetermined regeneration level.

2. The regenerative brake control device according to claim 1, wherein the amount of change in the regeneration ratio between the normal regeneration level and a first regeneration level that is set by the first regenerative braking force setting unit is smaller than the amount of change in the regeneration ratio between the first regeneration level that is set by the first regenerative braking force setting unit and a second regeneration level that is set by the first regenerative braking force setting unit, and a regeneration ratio of the first regeneration level that is set by the first regenerative braking force setting unit is smaller than a regeneration ratio of the second regeneration level that is set by the first regenerative braking force setting unit.

3. The regenerative brake control device according to claim 1, wherein the amount of change in the regeneration ratio between the normal regeneration level and a first regeneration level that is set by the second regenerative braking force setting unit is equal to the amount of change in the regeneration ratio between the first regeneration level that is set by the second regenerative braking force setting unit and a second regeneration level that is set by the second regenerative braking force setting unit.

4. The regenerative brake control device according to claim 2, wherein the amount of change in the regeneration ratio between the normal regeneration level and a first regeneration level that is set by the second regenerative braking force setting unit is equal to the amount of change in the regeneration ratio between the first regeneration level that is set by the second regenerative braking force setting unit and a second regeneration level that is set by the second regenerative braking force setting unit.

5. The regenerative brake control device according to claim 1, wherein one of regenerative levels of the first regenerative braking force setting unit is the same as one of regenerative levels of the second regenerative braking force setting unit.

6. The regenerative brake control device according to claim 2, wherein one of regenerative levels of the first regenerative braking force setting unit is the same as one of regenerative levels of the second regenerative braking force setting unit.

7. The regenerative brake control device according to claim 3, wherein one of regenerative levels of the first regenerative braking force setting unit is the same as one of regenerative levels of the second regenerative braking force setting unit.

8. The regenerative brake control device according to claim 4, wherein one of regenerative levels of the first regenerative braking force setting unit is the same as one of regenerative levels of the second regenerative braking force setting unit.

9. The regenerative brake control device according to claim 5, wherein the regeneration ratio of the second regeneration level that is set by the first regenerative braking force setting unit is equal to a regeneration ratio of a third regeneration level that is set by the second regenerative braking force setting unit.

10. The regenerative brake control device according to claim 6, wherein the regeneration ratio of the second regeneration level that is set by the first regenerative braking force setting unit is equal to a regeneration ratio of a third regeneration level that is set by the second regenerative braking force setting unit.

11. The regenerative brake control device according to claim 7, wherein the regeneration ratio of the second regeneration level that is set by the first regenerative braking force setting unit is equal to a regeneration ratio of a third regeneration level that is set by the second regenerative braking force setting unit.

12. The regenerative brake control device according to claim 1, wherein the first regenerative braking force setting unit is a shift lever and, the second regenerative braking force setting unit is a paddle switch.

13. The regenerative brake control device according to claim 1, wherein the electric-powered vehicle comprises:

a regenerative brake control unit that controls an electric motor that drives vehicle wheels into a given regeneration ratio which is set based on at least one of the first regenerative braking force setting unit and the second regenerative braking level setting unit; and an automatic vehicle-speed control unit that automatically controls a vehicle-speed, wherein the generative brake control unit returns the regenerative braking force to a preset initial value, irrespective of setting values by the first regenerative braking force setting unit and the second regenerative braking force setting unit, when the automatic vehicle-speed control unit is actuated.

14. The regenerative brake control device according to claim 13, wherein the normal regeneration level corresponds to a preset initial value of the regenerative braking force.

15. A regenerative brake control device for an electric-powered vehicle comprising:

a regenerative brake control unit that controls an electric motor which drives vehicle wheels into a regeneration ratio corresponding to a regenerative level to obtain a regenerative braking force;

a first regenerative braking force setting unit that sets the regenerative level with an operation of a shift lever; and a second regenerative braking force setting unit that is operated by a driver gripping a steering wheel to set the regenerative level, wherein the number of setting state of the regenerative level with the second regenerative braking force setting unit is equal to or larger than that of the first regenerative braking force setting unit, a change to weaken the regeneration ratio from a normal regeneration level is performed only by the second regenerative braking force setting unit.

16. The regenerative brake control device according to claim 15, wherein amounts of changes of the regenerative ratio between adjacent regenerative levels set by the first regenerative break control unit becomes larger as the regenerative level gets larger.

17. The regenerative brake control device according to claim 15, wherein amounts of changes of the regenerative ratio between adjacent regenerative levels set by the second regenerative break control unit are equal to each other.

18. The regenerative brake control device according to claim 15, the number of operations of the second regenerative braking force setting unit for changing the regenerative level from the normal regeneration level to a largest regeneration level in which the regeneration ratio becomes the largest is larger than that of the first regenerative braking breaking force setting unit.

19. The regenerative brake control device according to claim 15, the second regenerative braking force setting unit is paddle switch.

20. The regenerative brake control device according to claim 15 further comprising:
- an automatic vehicle-speed control unit that automatically controls a vehicle-speed,
- wherein the generative brake control unit ban the change to weaken the regeneration ratio from the normal regeneration level.

\* \* \* \* \*